United States Patent
Kearby et al.

(10) Patent No.: US 7,922,033 B2
(45) Date of Patent: Apr. 12, 2011

(54) UNIVERSAL LID FOR UNDERGROUND ACCESS BOXES

(75) Inventors: Don Michael Kearby, Breckenridge, TX (US); John Cary Sofyanos, Spicewood, TX (US); Jimmie Howard Wickham, Irving, TX (US); Kumud Jacob Lugun, New Delhi (IN); Gautam Gulati, Delhi (IN); Anurag Somit, Lucknow (U.P.) (IN)

(73) Assignee: Pentair Filtration, Inc., Golden Valley, MN (US)

( * ) Notice: Subject to any disclaimer, the term of this patent is extended or adjusted under 35 U.S.C. 154(b) by 381 days.

(21) Appl. No.: 12/013,633

(22) Filed: Jan. 14, 2008

(65) Prior Publication Data
US 2008/0128149 A1     Jun. 5, 2008

Related U.S. Application Data (63) Continuation-in-part of application No. 11/326,023, filed on Jan. 5, 2006, now abandoned.

(51) Int. Cl.
*B65D 39/00* (2006.01)
*B65D 43/04* (2006.01)
*B65D 51/00* (2006.01)

(52) U.S. Cl. ........ 220/789; 220/287; 220/800; 220/801; 220/298; 217/110; 217/114; 215/230

(58) Field of Classification Search ............. 220/789, 220/800, 300, 287, 784, 792, 3.8, 801, 799, 220/293, 298, 301, 302; 215/355, 319, 230; 217/110, 98, 106, 114, 113; 174/66; 404/25; 206/459.5; 138/89, 96 R
See application file for complete search history.

(56) References Cited

U.S. PATENT DOCUMENTS

| | | | |
|---|---|---|---|
| 1,491,325 A | 4/1924 | Thomas, Jr. | |
| 1,770,057 A | 7/1930 | Everett | |
| 2,497,827 A | 2/1950 | Trafton | |
| 3,370,615 A | 2/1968 | Tamaki et al. | |
| 3,674,149 A | 7/1972 | Donalson | |
| 3,920,347 A | 11/1975 | Sauriol et al. | |
| 3,996,966 A | 12/1976 | Princell | |
| 4,048,766 A | 9/1977 | Dantzer et al. | |
| 4,060,100 A | 11/1977 | Miller et al. | |
| 4,203,686 A | 5/1980 | Bowman | |
| RE30,326 E | 7/1980 | Van Buren, Jr. | |
| 4,363,420 A | 12/1982 | Andrews | |
| 4,482,267 A * | 11/1984 | Widerby | 403/377 |
| 4,504,009 A | 3/1985 | Boik et al. | |
| 4,534,088 A | 8/1985 | Ricke | |
| 4,591,290 A | 5/1986 | Prescott | |

(Continued)

OTHER PUBLICATIONS

Orman, Shelley; Water Works; Austin Business Journal, Aug. 31, 2007; http://austin.bizjournals.com/austin/stories/2007/09/03/smallb1.html.

(Continued)

*Primary Examiner* — Robin A. Hylton
(74) *Attorney, Agent, or Firm* — Quarles & Brady LLP (57) ABSTRACT

A universal lid closure for underground landscape and other utility access boxes uses flexible tongues depending from the underside of the lid and adapted to engage the interior of the access box, which box may have any one of various constructions. In one embodiment, the tongues have a plurality of diametrically opposed pairs of locking detents, each pair defining a different vertical position, to engage an annular locking shoulder on the interior of the box to secure the lid in the closed position.

10 Claims, 9 Drawing Sheets

U.S. PATENT DOCUMENTS

| | | | |
|---|---|---|---|
| 4,667,449 A | 5/1987 | Keating et al. | |
| 4,761,319 A | 8/1988 | Kraus et al. | |
| 4,834,290 A | 5/1989 | Bailey | |
| 4,861,186 A | 8/1989 | Ferns | |
| 4,883,194 A | 11/1989 | Fernandes | |
| 4,969,566 A | 11/1990 | Rogers | |
| 5,224,514 A | 7/1993 | Taylor | |
| 5,312,202 A | 5/1994 | Newton | |
| 5,337,792 A | 8/1994 | Tempel | |
| 5,351,718 A | 10/1994 | Barton | |
| 5,378,078 A | 1/1995 | Lewis et al. | |
| 5,394,898 A | 3/1995 | Turner | |
| 5,454,479 A | 10/1995 | Kraus | |
| 5,503,189 A | 4/1996 | Lamendola | |
| 5,505,324 A | 4/1996 | Danico | |
| 5,551,191 A | 9/1996 | Maiwandi | |
| 5,558,346 A | 9/1996 | Hartery | |
| 5,658,110 A | 8/1997 | Kraus | |
| 5,702,133 A | 12/1997 | Pavur et al. | |
| 6,109,822 A | 8/2000 | Campbell et al. | |
| 6,568,420 B2 | 5/2003 | Renn | |
| 6,612,082 B2 | 9/2003 | Schimmelpfennig et al. | |
| 6,683,247 B1 | 1/2004 | McTavish et al. | |
| 6,769,834 B1 | 8/2004 | Stange | |
| 6,887,012 B1 | 5/2005 | Zappe | |
| 2006/0201957 A1 | 9/2006 | Harrington et al. | |
| 2008/0310914 A1 | 12/2008 | Salas | |
| 2008/0310915 A1 | 12/2008 | Salas | |

OTHER PUBLICATIONS

Less Work. More Profit. Bottom Line!; http://www.groundtopper.com/troubleshooting.html.

Ground Topper, The Universal Valve Box Cover Produced by Grass Act—Austin TX; www.groundtopper.com.

* cited by examiner

UNIVERSAL LID FOR UNDERGROUND ACCESS BOXES

CROSS REFERENCE TO RELATED APPLICATIONS

This is a continuation-in-part of application Ser. No. 11/326,023, filed on Jan. 5, 2006 now abandoned.

BACKGROUND OF THE INVENTION

Underground landscape boxes are used by many industries as a means of housing components of the particular industry. Underground landscape boxes are almost used exclusively in landscape but can be used in a number of other areas such as large concrete areas. The underground landscape box may house electrical connections, electric valves, water shut-off valves, and cable TV connections. These samples are just a few of the many and varied applications.

As underground landscape boxes have grown in popular use, more manufacturers have emerged, each making their box unique as to size and specification. The uniqueness of each box can be seen in box circumference. In the class, econo-box, the circumference may vary from 6¼" all the way to 7". This difference in circumference means the corresponding lid closure will vary in its diameter resulting in as many lid closure sizes as there are manufacturers.

Over time, as millions of underground landscape boxes have been installed, the lids are subject to needed replacement from deterioration, or removal by vandalism or removal by gas powered equipment. When the end user needs to replace missing lids, they are often forced to dig up the entire underground box body and replace said box with whatever manufactured brand their local wholesaler or retailer might be carrying in any particular year.

The wholesaler and retailer arbitrarily change manufacturers over time due to better pricing, better warranty, or rebate incentives. As more and more manufacturers have entered into the same markets, wholesalers and retailers are forced to make inventory decisions based on replacement market sales. The decisions are: 1. carry multiple manufactured lines of underground landscape boxes thereby increasing inventory levels. Or 2. carry one line of underground landscape boxes and lose replacement sales to their competitors.

Prior art patents found included U.S. Pat. No. 4,591,290, entitled "Combination Adjustable Valve Box Adapter and Replacement for Broken Valve Boxes", issued May 27, 1986 by Everett J. Prescott; U.S. Pat. No. 5,394,898, entitled "Valve Box Adapter", issued Mar. 7, 1995 to Frank J. Turner; and U.S. Pat. No. 6,568,420, entitled "Valve Box", issued May 27, 2003 to Saint-Gobain Performance Plastics Corporation.

In previous searched patent applications, the Prescott Patent was issued based on fixing broken boxes by placing an insertion device inside the underground box wall. This then allowed a smaller lid to be used on the box.

The Prescott patent has two problems with its methodology. 1. It uses an insertion device and then a replacement lid, which accounts for two parts, and two stock keeping units for the wholesaler or retailer to inventory. 2. It involves using a smaller lid whereas the present application has one lid that will universally fit all currently manufactured and future manufactured underground landscape boxes.

No prior technology makes a replacement lid that can be used as closure for all manufactured products on the market today or for future manufactured product.

SUMMARY OF THE INVENTION

The primary object of the invention is to provide a universal lid closure for underground landscape boxes.

Another object of this invention is to provide a lid closure that universally adapts to all underground landscape boxes by the design of a flexible flap with a specific width. Another object of the invention is to provide a lid closure that universally adapts to all underground landscape boxes by the design of a flexible flap with a specific length. Another object of the invention is to provide a plurality of flexible flaps that prevent accidental lid removal by exerting force at a precise angle on the underground box wall. Another object of the invention is to provide a lid top that is manufactured to enclose all underground landscape box opening circumferences in each individual box class. Another object of this invention is to provide a plurality of flexible flaps molded at a precise angle to horizontal to deter fatigue within the flexible flap.

Another object of this invention is to provide one Stock Keeping Unit as a means of inventory control.

Yet another object of this invention is to provide a replacement solution to prevent unnecessary labor associated with replacing outdated or no longer manufactured underground landscape boxes.

Other objects and advantages of the present invention will become apparent from the following descriptions, taken in connection with the accompanying drawings, wherein, by way of illustration and example, an embodiment of the present invention is disclosed.

In a presently preferred embodiment of the invention, a universal lid is provided for a broad range of access boxes in which the undercut annular abutment shoulder may be located axially within the box in as many as six different locations. This embodiment is directed to a more universal lid which can be adapted to close a large number of varying access box constructions. The universal lid has a disk-shaped body that is adapted to overlie and close the access box opening. A plurality of tabs extend downwardly from and are generally perpendicular to the underside of the body. Each tab includes a flexible tongue that is formed integrally with the tab and extends generally circumferentially with respect to the lid body. The tongues are dimensioned to contact the box opening and to deflect radially inwardly to provide frictional contact with the interior wall portion of the box.

The tongues have trailing edges, each trailing edge including a lower lead-in surface portion that is adapted to facilitate radially inward deflection of the tongue, and a locking detent above the lead-in portion of the trailing edge which is adapted to engage the shoulder and to provide locking contact therewith. The tabs of each diametrically opposed pair are identical and the tongues of one opposed pair are shaped differently from the tongues of the other opposed pair. Preferably, the plurality of tabs comprises at least two pairs of diametrically opposed tabs.

Preferably, the trailing edge of each flexible tongue includes a plurality of vertically spaced locking detents. The locking detents of one opposed pair are positioned along the trailing edge at a location different from the position of the locking detents of the other opposed pair.

The flexible tongues are positioned to extend generally tangentially with respect to the lid body. The tabs which support the flexible tongues have a semicircular shape that is coaxial with the lid body.

Preferably, the tabs are connected to the lid body with reinforcing gussets. The gussets extend radially inwardly from the tabs and are connected to a central cylindrical support that is coaxial with and extends downwardly from the underside of the lid body.

In a modified embodiment, the lid body includes at least two pairs of circumferentially spaced resilient flexible flaps that are attached to and extend downwardly from and are generally perpendicular to the underside of the body. The flaps have trailing edges that are dimensioned to contact the box opening and to deflect radially inwardly to provide frictional contact with the interior wall. Circumferentially adjacent pairs of flaps have different axial lengths.

Preferably, the flaps are disposed in diametrically opposed pairs and the flaps of each opposed pair are identical. The trailing edge of each flap includes an angled lower lead-in edge, a generally vertical upper edge portion, and a locking detent in a transition between the lower lead-in edge and the upper edge portion. The locking detents on circumferentially adjacent pairs of flaps are disposed at different axial positions.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENT

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
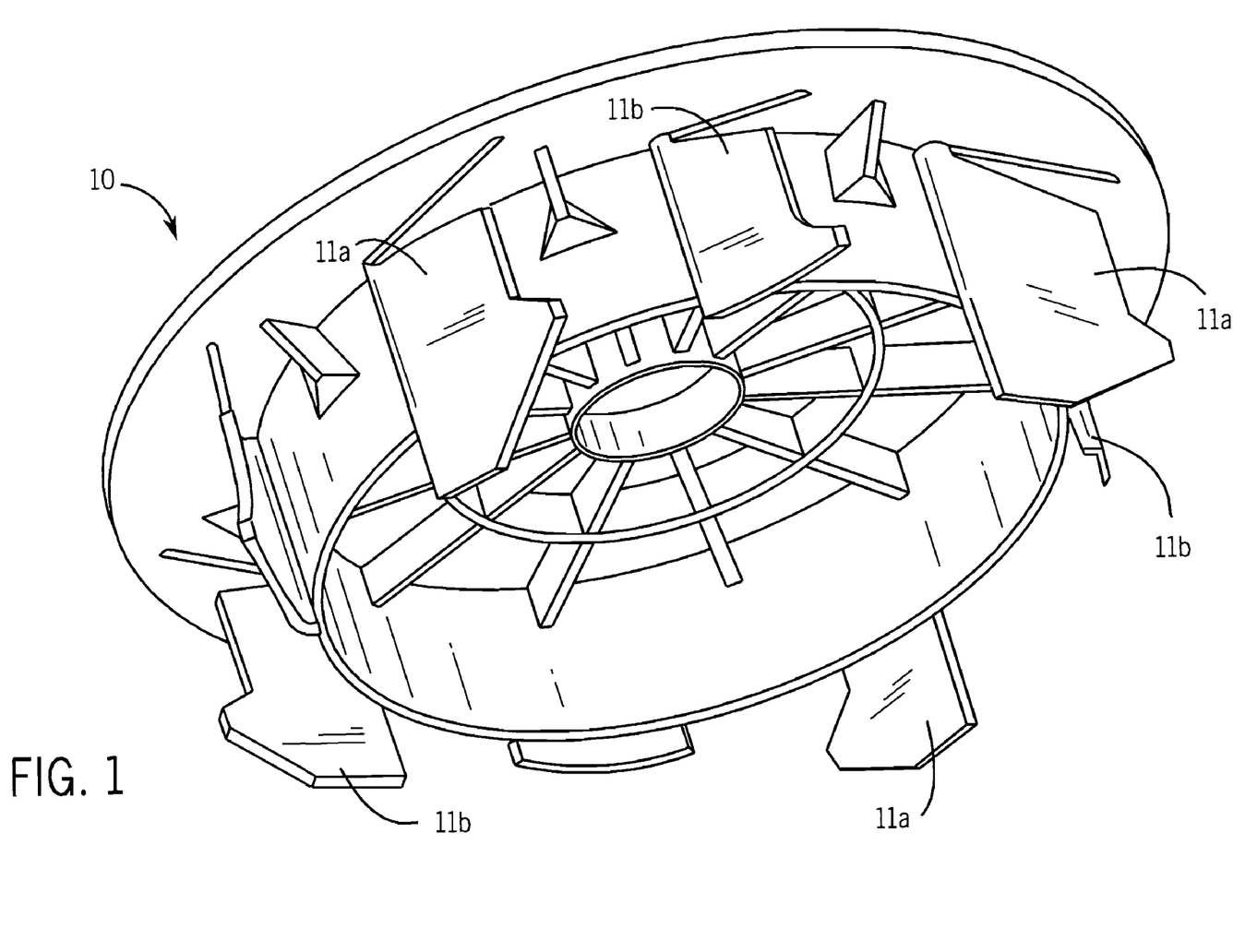
FIG. 1. is a perspective view of the invention showing the flexible flaps from the lid underside.

Turning first to FIG. 1 there is shown the underside of the universal underground landscape box lid 10 illustrating the flexible laps 11a and 11b. A plurality of flexible flaps 11a and 11b are provided with said lid. 10. The flexible flaps 11a and 11b are of varying widths and lengths to accommodate and engage varying circumference and engagement rings of specific manufactured underground landscape boxes. The smaller width and length flexible flaps 11b are used to engage small circumference underground landscape boxes with a high engagement point of contact and a high engagement ring. The larger width and length flexible flaps 11a are used to engage larger circumference underground landscape boxes with a lower point of contact and a low engagement ring. The precision angle cut to horizontal of the flexible flaps 11a and 11b allow for the flexible flap to maintain its energy when contacting the underground landscape box inner wall 31 thus preventing accidental removal of the universal box lid 10.

Figure 2:
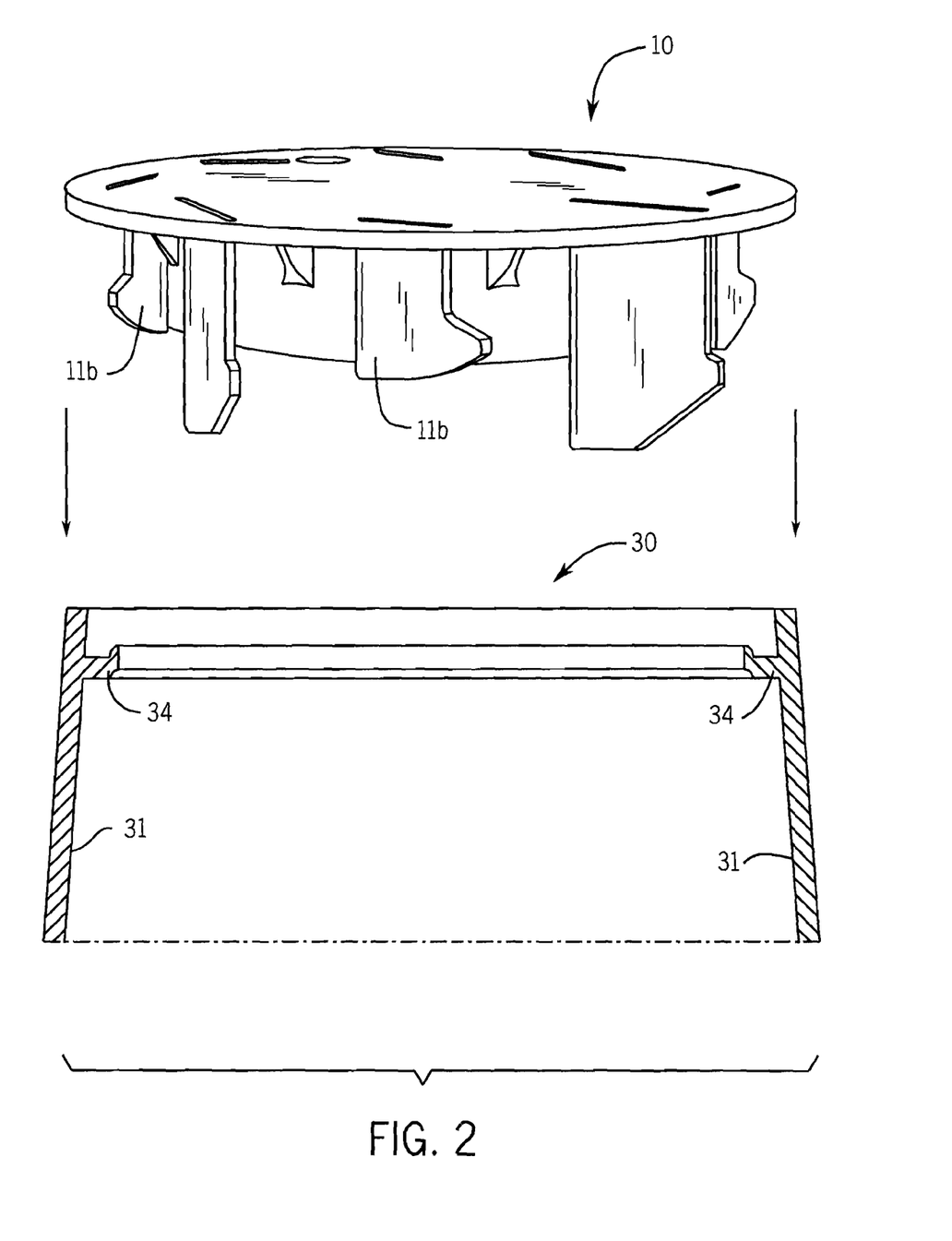
FIG. 2. is a perspective view of the invention showing the lid engagement points to the underground landscape box.

Referring now to FIG. 2 there is shown an underground landscape box 30 and said box's inner wall 31 where the flexible flaps 11b of the universal lid 10 would contact and engage the inner wall 31 and the inner wall engagement ring 34.

Figure 3:
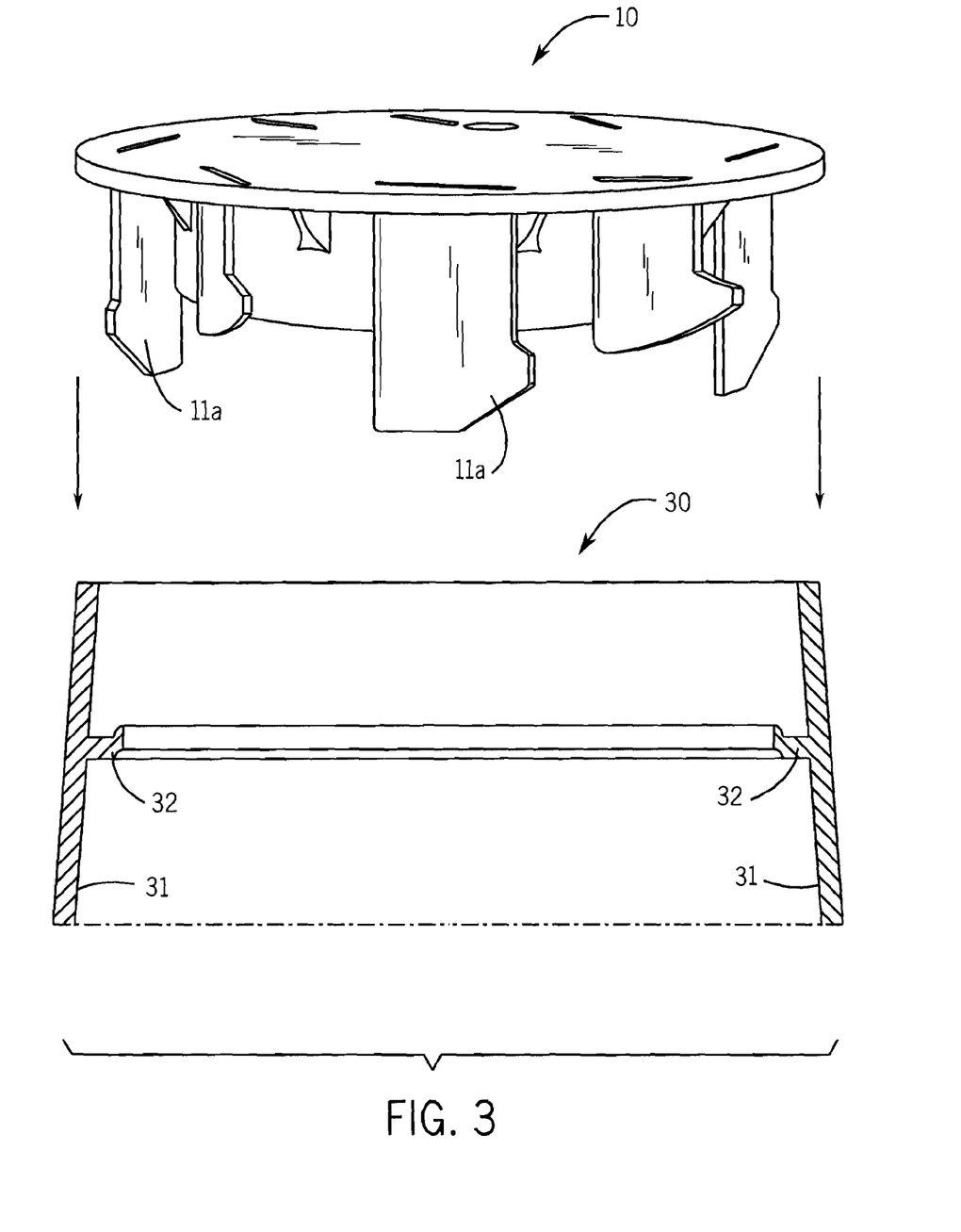
FIG. 3. is another perspective view of the invention showing the lid engagement points to the underground landscape box.

Referring now FIG. 3 there is shown an underground landscape box 30 and said box's inner wall 31 where the flexible flaps 11a would contact and engage the inner wall 31 and where the flexible flaps 11a would engage the inner wall engagement ring 34.

Figure 4:
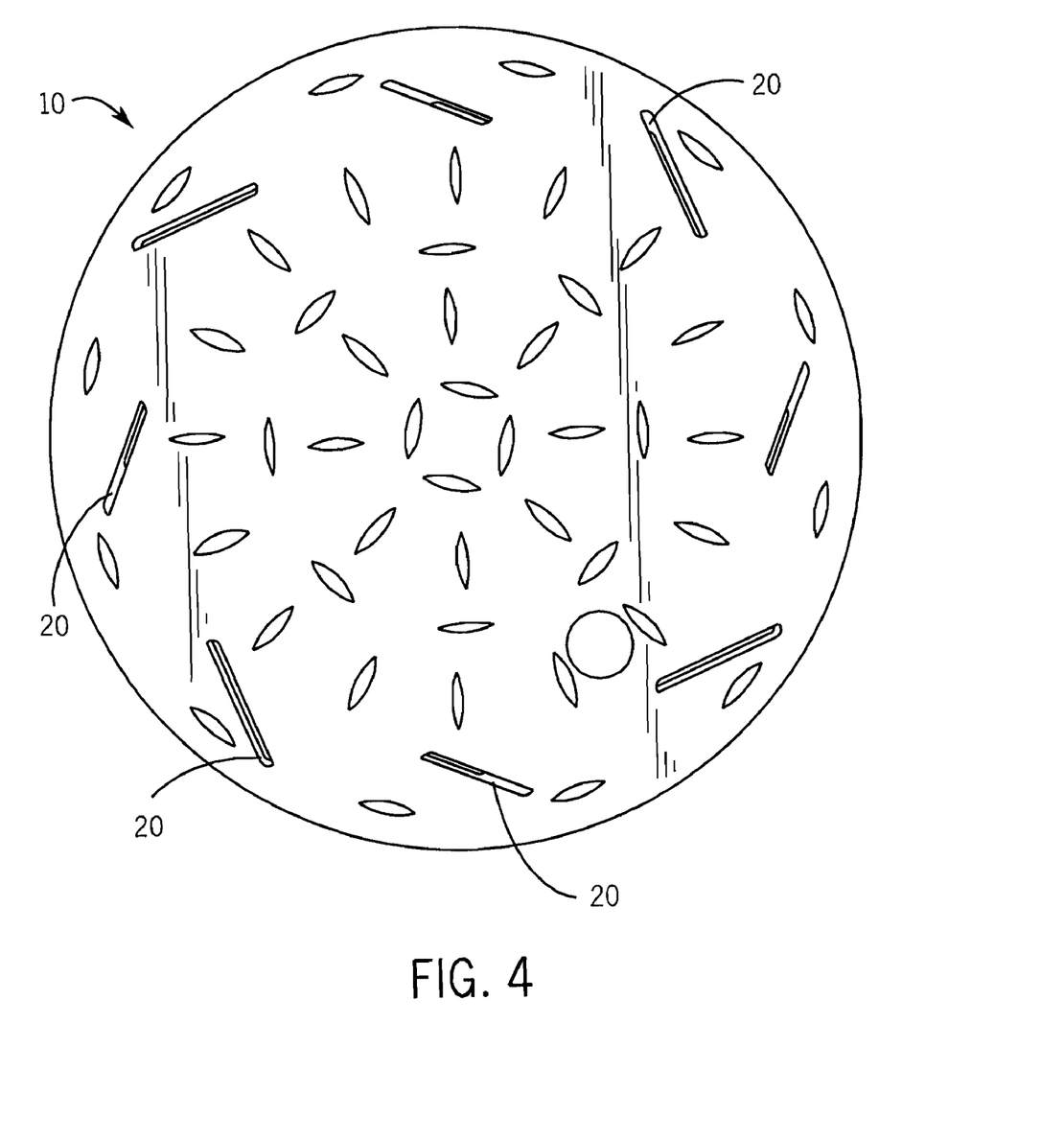
FIG. 4. is a perspective view of the invention showing the lid top with the precision cuts for the flexible flaps.

Referring now to FIG. 4 there is shown the top side of the universal lid 10 illustrating the precision angles 20 cut into the universal lid 10. The precision angles 20 cut to horizontal allow for energy retention of the flexible flap 11a and 11b in insertion and removal of the universal lid 10.

FIGS. 5-8 are sectional views of four different constructions of access boxes in common use today. These are only representative of the many sizes and shapes of access boxes. However, boxes shown in FIGS. 5-8 can all be closed with the lid of the embodiment to be described hereinafter.

Each of the boxes in FIGS. 5-8 has a generally cylindrical shape or, more accurately, a frustoconical shape. Each of the boxes is open at the top and the bottom, as is also conventional in the industry. Further, each of the boxes includes an undercut annular shoulder to accommodate some type of locking engagement with a lid, but the undercut shoulders, as may be seen, are located in different axial positions. In addition, the diameters of the boxes at their upper circular openings may also vary.

Figure 5:
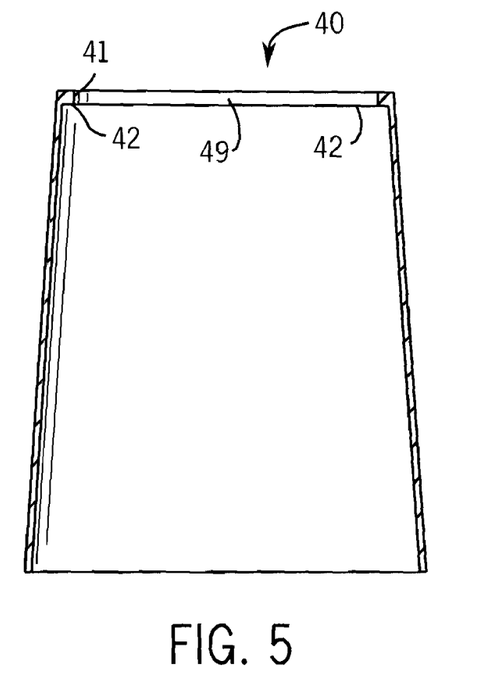
FIGS. 5-8 show variations in the construction of various access boxes for which the lid of the present invention is adapted.
Figure 6:
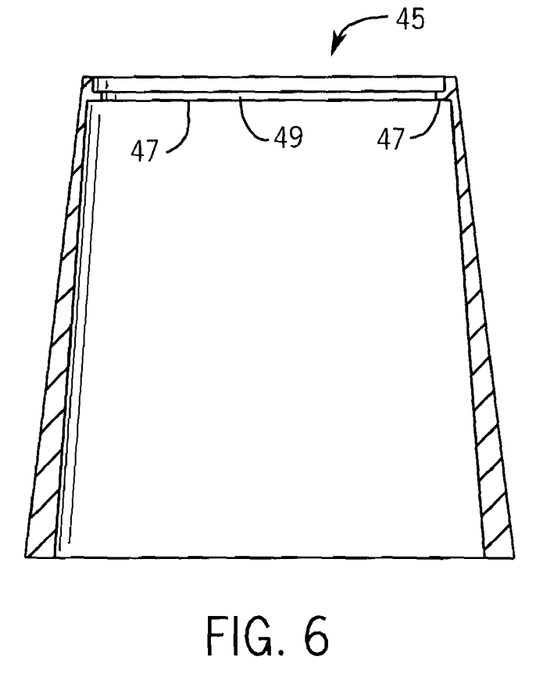

In the access box 40 of FIG. 5, the OD at the top is 6.25 in. The distance from the top edge of the box to the underside of the annular shoulder 42 is 0.26 in. At the opposite extreme, as shown in FIG. 8, the box 43 has an OD at the top of 6.28 in. and the distance from the undercut annular shoulder 44 to the top edge is 1.1 in. Boxes 45 and 46, shown in FIGS. 6 and 7 respectively, have slightly different ODs. In box 45, the ring defining the annular undercut shoulder 47 is 0.39 in. from the top edge, and in box 46, the height from the annular shoulder 48 to the top edge of the box is 0.72 in.

It should be noted that the access boxes 40, 45 and 46 (FIGS. 5, 6 and 7), and respective annular shoulders 42, 47 and 48 are defined by an annular interior rib 49. In the access box 43 of FIG. 8, on the other hand, the annular shoulder 44 is defined by an interior surface transition between an upper cylindrical face 59 and the lower frustoconical surface of the remainder of the box. Nevertheless, each of the annular shoulders functions in a similar manner to permit locking engagement with the lid 50.

Figure 7:
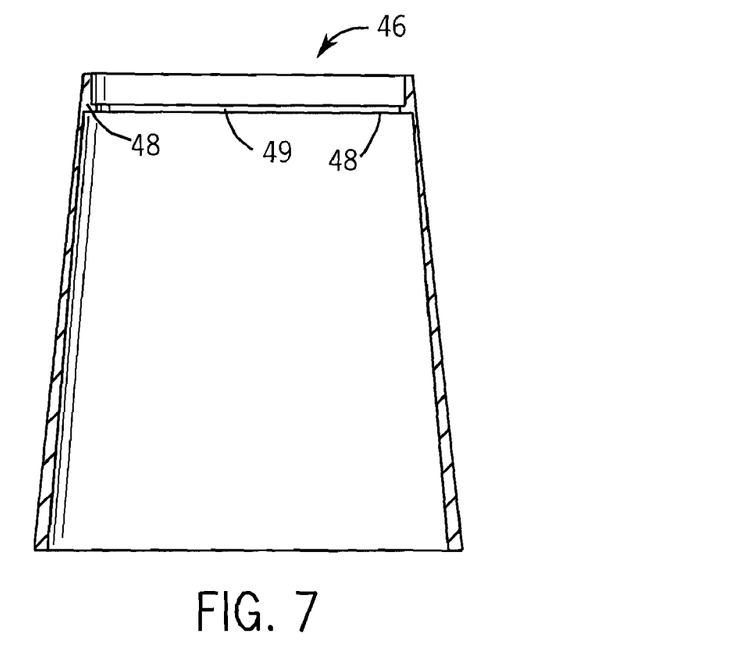
Figure 8:
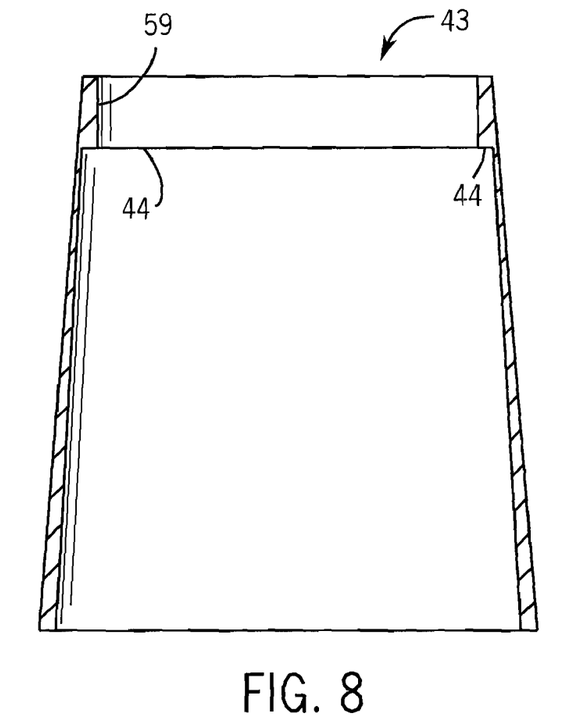
Figure 9:
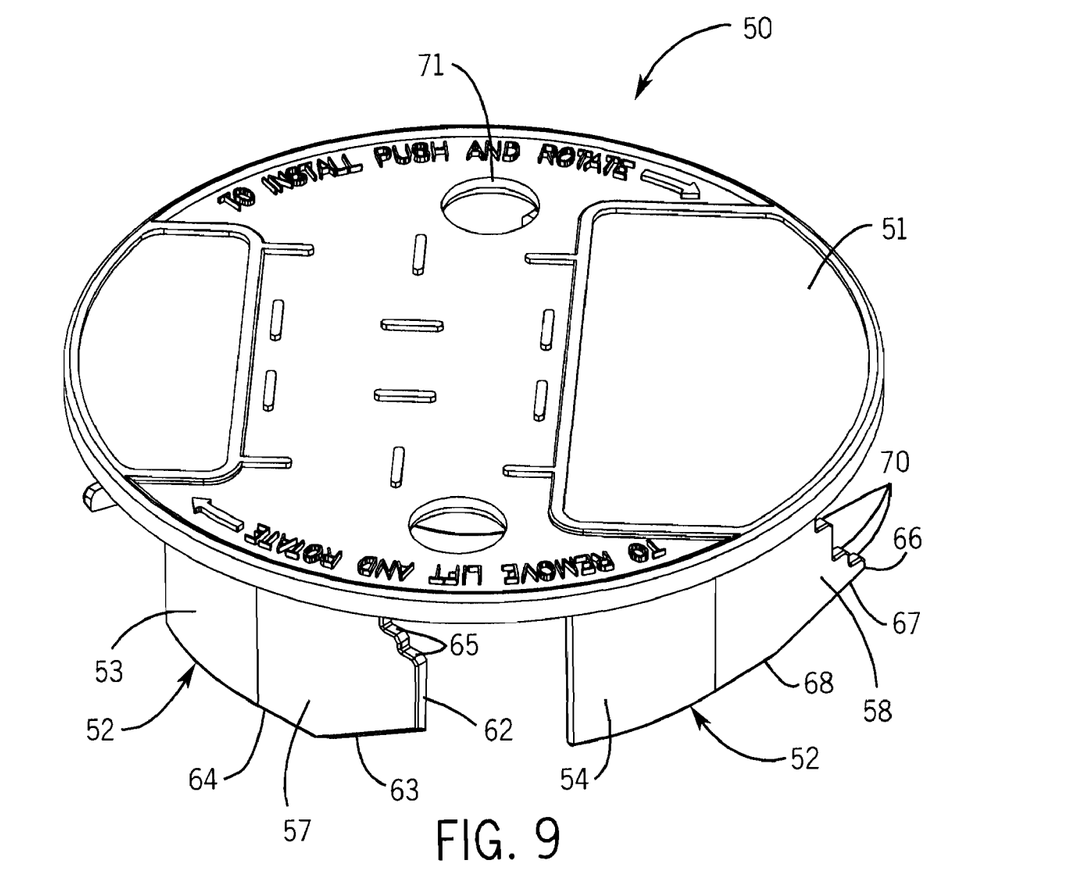
FIG. 9 is a top perspective view of another embodiment of the lid.

The universal lid 50 shown in FIG. 9 is adapted to provide locking closure for any of the boxes of FIGS. 5-8, as well as other access boxes in use today. The lid 50 includes a substantially solid disk-shaped body 51 which is large enough in diameter to completely overlie any of the boxes shown in FIGS. 5-8 and boxes of even larger ODs.

Figure 10:
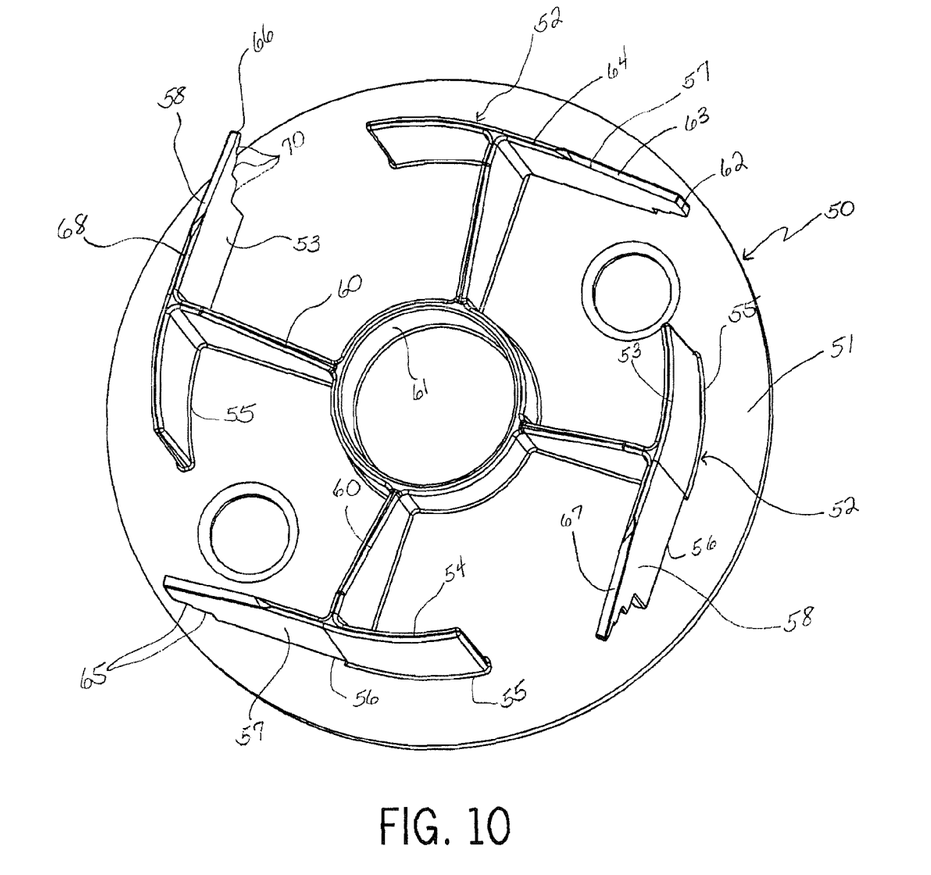
FIG. 10 is a bottom perspective view of the lid shown in FIG. 9.
Figure 11:
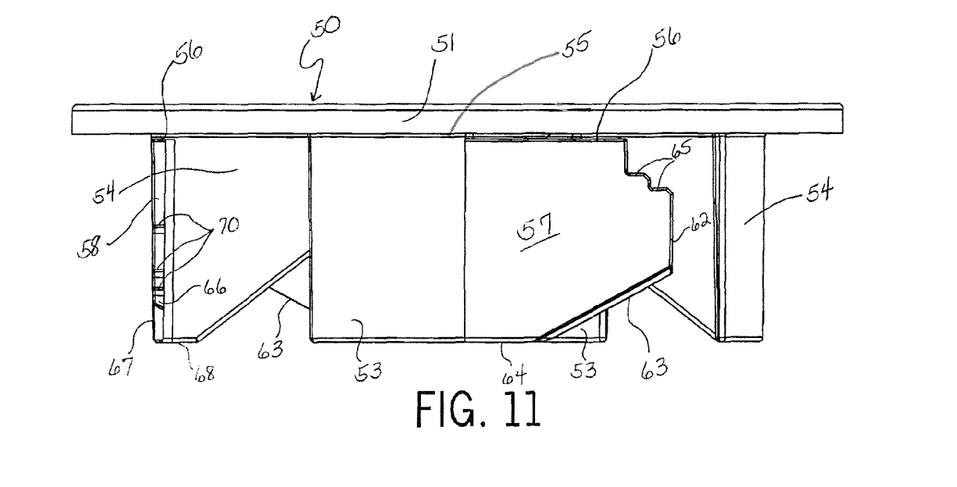
FIG. 11 is a side elevation of the lid shown in FIGS. 9 and 10.

Referring also to FIG. 10, a plurality of engagement tabs 52 extend downwardly from the underside of the body 51 and are generally perpendicular thereto. The tabs 52 include diametrically opposed pairs, the tabs of each pair being somewhat different in size and shape than the tabs of the other pair, as will be described in more detail. However, the tabs 52 are all preferably of the same axial length and have lower edges lying in a common plane that is parallel to the body 51.

Each tab 53 or 54 of one diametrically opposed pair has a first top edge portion 55 that is molded integrally with the lid body 51 and a contiguous second top edge portion 56 that is separated and spaced from the underside of the body 51. The portion of the tab 53 or 54 including the separated second top edge portion 56 defines a flexible tongue 57 or 58 of each respective tab pair 53 or 54. At the junction of the first and second top edge portions 55 and 56, each tab 54 or 55 is reinforced with a vertical gusset 60 that, in turn, is attached to a central cylindrical support 61.

The portion of each tab 53 and 54 that is integrally and rigidly attached to the underside of the lid body 51 has a generally cylindrical shape that is coaxial with the vertical centerline of the lid. However, the flexible tongues 57 and 58 extend generally tangentially with respect to the rigid tab portions.

Looking first at the tabs 53 of one tab pair, the flexible tongue 57 includes a vertical trailing edge 62 that joins an angled lead-in edge portion 63 that, in turn, extends downwardly to join a horizontal bottom edge 64 of the tongue 57. The upper portion of the trailing edge 62 of tongue 57 is stepped to define a pair of vertically spaced horizontal detents 65. The trailing edge 62 terminates at the second top edge portion 56 of the tongue 57 and, as previously described, the second top edge portion 56 is spaced from the underside of the lid body 51, thereby permitting the tongue 57 to flex.

In a similar manner, the other pair of identical diametrically opposed tabs 54 each includes a flexible tongue 58 having a trailing edge 66 that is substantially shorter vertically than the trailing edge 62 of previously described flexible tongues 57. The lower end of trailing edge 66 joins an angled lead-in edge portion 63 that extends downwardly and forwardly to join a horizontal bottom edge 68 of the tongue 58. Above the upper end of the trailing edge 66, a stepped construction defines three vertically spaced horizontal detents 70, the uppermost of which lies vertically below the lowermost detent 65 of the previously described pair of tabs 53. Thus, the horizontal detents 65 and 70 each define a horizontal detent surface at a different vertical position with respect to the lid body 51. Each of these positions is dimensioned to permit locking engagement between a horizontal detent 65 or 70 and one of the annular shoulders (e.g. 42, 44, 46 or 48) on the interior of the respective access box, as shown in FIGS. 5-8.

Figure 12:
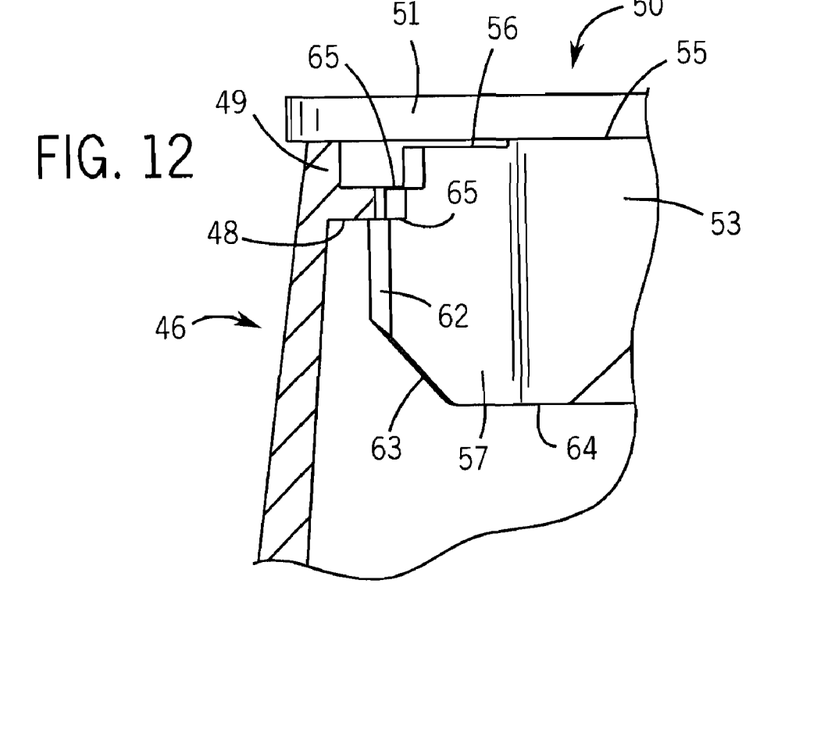
FIG. 12 is a sectional detail showing attachment of the FIG. 9 lid to the access box of FIG. 7.

Referring to the access box 46 of FIG. 7, the lid 50 shown in FIG. 9, and the sectional detail of FIG. 12, the locking attachment of the lid 50 to the box 46 will now be described. When the lid 50 is brought vertically downward onto the top edge of the box 46, there is initial engagement between the unflexed tongue pairs 57 and 58 along their respective angled lead-in edge portions 63 and 67 and the top edge of the box 46. With the installer grasping the lid body 51 by the finger holes 71, the lid 50 is simultaneously pressed downwardly and rotated in the clockwise direction. This compound motion causes the tabs 53 and 54 to simultaneously ride along the respective angled lead-in edge portions 63 and 67 and to flex radially inwardly. After the rearward end of the angled lead-in edge portion 63 reaches the top edge of the box 46, the vertical trailing edge 62 of the flexible tongue 57 moves downwardly over the rib 49 defining the annular shoulder 48. When the underside of the lid body 51 reaches the top edge of the box 46, the lowermost of the horizontal detents 65 engages the annular shoulder 48 in response to resilient radially outward movement of the tongues 57. In this fully closed position, trailing edges 62 and 66 of both pairs of flexible tongues 57 and 58 make frictional contact with the interior wall of the box. In addition, locking contact between the horizontal detent 65 and the annular shoulder 48 helps hold the lid in position against inadvertent dislodgement.

When it is desired to remove the lid 50 and open the access box 46, the lid is grasped by the finger holes 71, rotated in the same clockwise direction and simultaneously pulled vertically upwardly. This results in reverse tab movement, whereby the detents 65 override the annular shoulder 48 and the tongues 57 and 58 slide past the open upper end of the box until the respective horizontal bottom tongue edges 64 and 68 clear the top edge of the box.

Figure 13:
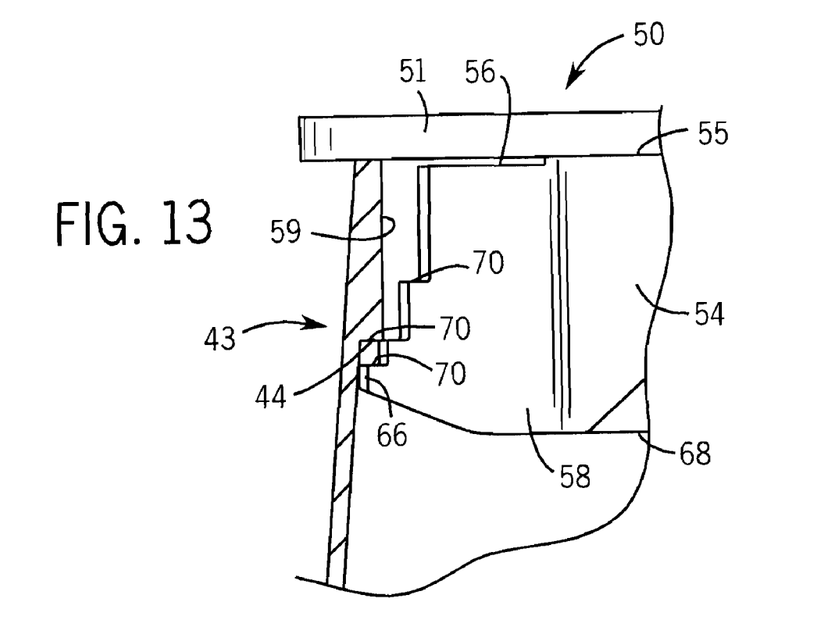
FIG. 13 is a sectional detail showing attachment of the FIG. 9 lid to the access box of FIG. 8.

In attachment of the universal lid 50 to the access box 43 of FIG. 8, the procedure is essentially the same as that described with respect to box 46 of FIG. 7, except that the other pair of tabs 54 provide the flexible tongues 58 with the lid locking function. Referring also to FIG. 13, the interior annular shoulder 44 is located in the box 43 at an axial position that is much lower than the shoulder 48 in the box 46 of FIG. 7. When the lid 50 is pushed downwardly into the box 43 and rotated in the clockwise direction, the same movement of the flexible tongues 57 and 58 as previously described will occur. When the lid body 51 reaches the upper edge of the box 43, the middle one of the three horizontal locking detents 70 on each tongue 58 overrides and snaps into position beneath the annular shoulder 44. This provides the same locking engagement previously described.

With access boxes having annular locking shoulders in different vertical positions, movement of the lid vertically downward to the fully closed position automatically causes locking engagement between one of the detents 65 of the first tab pair 53 or one of the detents 70 of the other pair of tabs 54. If for any reason an access box is encountered where there is not a direct match-up of a locking detent with an annular shoulder, the lid is still held in its closed position by frictional engagement of the trailing edges 62 and 66 of the flexible tongues 57 and 58.

The embodiment of the lid shown in FIG. 1 has eight (four opposed pairs) flexible tongues or flaps 11a and 11b. In the FIG. 10 embodiment, there are four (two opposed pairs) of tabs 51 and 52. It is believed, however, that a lid construction using this view as three tabs with integral flexible tongues could function adequately with a wide range of access boxes such as described hereinabove.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A universal lid for an access box for an underground utility, the access box having a generally cylindrical shape defining an upper circular opening, an annular interior wall portion defining an undercut annular shoulder, the lid comprising:

a disk-shaped lid body adapted to overlie and close the access box opening;

pairs of diametrically opposite tabs extending downwardly from and generally perpendicular to the underside of the body, the tabs having semi-cylindrical outer surfaces defining a common radially outer cylindrical surface, each tab including a flexible tongue formed integrally with the tab and joined thereto along a vertical connecting seam, said tongues extending generally circumferentially from the connecting seam with respect to the lid body and tangentially with respect to the outer surface of the tab, the tongues having upper edges spaced from the underside of the lid body and flat radially outer surfaces dimensioned to contact the box opening and to deflect radially inwardly to provide radially biased frictional contact with the interior wall portion and each of said tongues having a trailing edge defining a plurality of vertically spaced stepped detents providing selective locking contact with the underside of the shoulder, and circumferentially adjacent tongues having respective pluralities of detents that are vertically separated.

2. The apparatus as set forth in claim 1 wherein the tongues include a lower upwardly angled lead-in edge portion extending along a lower tongue edge to the trailing edge of the tongue and adapted to facilitate radially inward deflection of the tongue.

3. The apparatus as set forth in claim 2 wherein said pairs of diametrically opposed tabs comprises at least two pairs of diametrically opposed tabs.

4. The apparatus as set forth in claim 3 wherein the tabs of each diametrically opposed pair are identical and the tongues of one opposed pair are shaped differently from the tongues of the other opposed pair.

5. The apparatus as set forth in claim 3 wherein the locking detents of one opposed pair are positioned along the trailing edge at a location different from the position of the locking detents of the other opposed pair.

6. The apparatus as set forth in claim 1 wherein the tabs are coaxial with the lid body.

7. The apparatus as set forth in claim 1 including gussets connecting the tabs to the underside of the lid body.

8. The apparatus as set forth in claim 7 wherein the gussets extend radially inwardly from the tabs and are connected to a central cylindrical support coaxial with and extending downwardly from the underside of the lid body.

9. The apparatus as set forth in claim 2 wherein the trailing edge of each tongue includes a generally vertical upper edge portion, and a locking detent in a transition between the lower lead-in edge and the upper edge portion.

10. The apparatus as set forth in claim 9 wherein the locking detents on circumferentially adjacent pairs of flaps are disposed at different axial positions.

* * * * *